US009528814B2

(12) United States Patent
Nikolenko et al.

(10) Patent No.: US 9,528,814 B2
(45) Date of Patent: Dec. 27, 2016

(54) APPARATUS AND METHOD OF USING IMPEDANCE RESONANCE SENSOR FOR THICKNESS MEASUREMENT

(75) Inventors: Yury Nikolenko, San Jose, CA (US); Matthew Fauss, Boulder Creek, CA (US)

(73) Assignee: NeoVision, LLC, Albany, CA (US)

( * ) Notice: Subject to any disclaimer, the term of this patent is extended or adjusted under 35 U.S.C. 154(b) by 1261 days.

(21) Appl. No.: 13/473,092

(22) Filed: May 16, 2012

(65) Prior Publication Data
US 2012/0293188 A1 Nov. 22, 2012

Related U.S. Application Data

(60) Provisional application No. 61/487,932, filed on May 19, 2011.

(51) Int. Cl.
*G01N 27/72* (2006.01)
*G01R 27/08* (2006.01)
(Continued)

(52) U.S. Cl.
CPC .............. *G01B 7/08* (2013.01); *B24B 37/005* (2013.01); *G01B 7/06* (2013.01); *G01B 7/10* (2013.01)

(58) Field of Classification Search
CPC .............. G01B 7/08; G01B 7/10; G01B 7/06; B24B 37/005
(Continued)

(56) References Cited

U.S. PATENT DOCUMENTS 2,583,724 A 1/1952 Broding
3,774,103 A 11/1973 Laukien
(Continued)

FOREIGN PATENT DOCUMENTS

GB 1471480 A 4/1977
SU 1408391 A1 7/1988
(Continued)

OTHER PUBLICATIONS

Office Action for U.S. Appl. No. 12/887,887, dated Mar. 1, 2013.
Notification of Transmittal of the International Search Report and Written Opinion for PCT/US2012/038369, dated Nov. 6, 2012.
The International Search Report for PCT/US2012/038369.
Written Opinion for PCT/US2012/038369.
International Search Report and Written Opinion for PCT/US2010/049824, dated Feb. 10, 2011.
(Continued)

*Primary Examiner* — Farhana Hoque
(74) *Attorney, Agent, or Firm* — Pergament & Cepeda LLP; Edward D. Pergament; Milagros A. Cepeda

(57) ABSTRACT

An apparatus for, and methods of use for, measuring film thickness on an underlying body are provided. The apparatus may include at least one Impedance Resonance (IR) sensor, which may include at least one sensing head. The at least one sensing head may include an inductor having at least one excitation coil and at least one sensing coil. The excitation coil may propagate energy to the sensing coil so that the sensing coil may generate a probing electromagnetic field. The apparatus may also include at least one power supply, at least one RF sweep generator electrically connected to the excitation coil; at least one data acquisition block electrically connected to the sensing coil; at least one calculation block; and at least one communication block. Methods of monitoring conductive, semiconductive or non-conductive film thickness, and various tools for Chemical Mechanical Polishing/Planarization (CMP), etching, deposition and stand-alone metrology are also provided.

24 Claims, 13 Drawing Sheets

(51) Int. Cl.
  *G01B 7/06* (2006.01)
  *B24B 37/005* (2012.01)
(58) Field of Classification Search
  USPC .................................. 324/232, 655, 724
  See application file for complete search history.

(56) References Cited

U.S. PATENT DOCUMENTS

| | | |
|---|---|---|
| 4,058,766 A | 11/1977 | Vogel et al. |
| 4,334,604 A | 6/1982 | Davies |
| 4,433,286 A | 2/1984 | Capots |
| 5,003,262 A | 3/1991 | Egner et al. |
| 5,091,704 A | 2/1992 | Kopera |
| 5,132,617 A | 7/1992 | Leach et al. |
| 5,213,655 A | 5/1993 | Leach et al. |
| 5,242,524 A | 9/1993 | Leach et al. |
| 5,343,146 A | 8/1994 | Koch et al. |
| 5,516,399 A | 5/1996 | Balconi-Lamica et al. |
| 5,541,510 A | 7/1996 | Danielson |
| 5,550,478 A | 8/1996 | Kopera |
| 5,559,428 A | 9/1996 | Li et al. |
| 5,644,221 A | 7/1997 | Li et al. |
| 5,659,492 A | 8/1997 | Li et al. |
| 5,660,672 A | 8/1997 | Li et al. |
| 5,663,637 A | 9/1997 | Li et al. |
| 5,731,697 A | 3/1998 | Li et al. |
| 5,770,948 A | 6/1998 | Li et al. |
| 5,889,401 A | 3/1999 | Jourdain et al. |
| 5,942,893 A | 8/1999 | Terpay |
| 6,072,313 A | 6/2000 | Li et al. |
| 6,310,480 B1 | 10/2001 | Cohen et al. |
| 6,377,039 B1 | 4/2002 | Goldfine et al. |
| 6,380,747 B1 | 4/2002 | Goldfine et al. |
| 6,404,197 B1 | 6/2002 | Anderson et al. |
| 6,404,199 B1 | 6/2002 | Fujita et al. |
| 6,407,546 B1 | 6/2002 | Le et al. |
| 6,433,541 B1 | 8/2002 | Lehman et al. |
| 6,448,795 B1* | 9/2002 | Ermakov ............ G01N 27/023 324/719 |
| 6,511,851 B1 | 1/2003 | Payne et al. |
| 6,558,229 B2 | 5/2003 | Kimura et al. |
| 6,563,308 B2 | 5/2003 | Nagano et al. |
| 6,593,738 B2 | 7/2003 | Kesil et al. |
| 6,602,724 B2 | 8/2003 | Redeker et al. |
| 6,621,264 B1 | 9/2003 | Lehman et al. |
| 6,657,433 B1 | 12/2003 | Locatelli et al. |
| 6,663,469 B2 | 12/2003 | Kimura et al. |
| 6,669,557 B2 | 12/2003 | Adams et al. |
| 6,707,540 B1 | 3/2004 | Lehman et al. |
| 6,741,076 B2 | 5/2004 | Le |
| 6,762,604 B2 | 7/2004 | Le |
| 6,815,947 B2 | 11/2004 | Scheiner et al. |
| 6,878,038 B2 | 4/2005 | Johansson et al. |
| 6,891,380 B2 | 5/2005 | Kesil et al. |
| 6,920,399 B2 | 7/2005 | Priev et al. |
| 6,923,711 B2 | 8/2005 | Laursen et al. |
| 6,966,816 B2 | 11/2005 | Swedek et al. |
| 6,975,107 B2 | 12/2005 | Hanawa et al. |
| 6,977,503 B2 | 12/2005 | Prado |
| 7,008,296 B2 | 3/2006 | Swedek et al. |
| 7,008,297 B2 | 3/2006 | Johansson et al. |
| 7,016,795 B2 | 3/2006 | Swedek et al. |
| 7,043,402 B2 | 5/2006 | Phillips et al. |
| 7,046,001 B2 | 5/2006 | Tada et al. |
| 7,070,476 B2 | 7/2006 | Lehman et al. |
| 7,074,109 B1 | 7/2006 | Bennett et al. |
| 7,078,894 B2 | 7/2006 | Tada et al. |
| 7,095,230 B2 | 8/2006 | Blumich et al. |
| 7,135,870 B2 | 11/2006 | Mohajer et al. |
| 7,195,536 B2 | 3/2007 | Swedek et al. |
| 7,198,545 B1 | 4/2007 | Korovin et al. |
| 7,219,024 B2 | 5/2007 | Gamache et al. |
| 7,247,080 B1 | 7/2007 | Bennett et al. |
| 7,332,902 B1 | 2/2008 | Vermeire et al. |
| 7,352,186 B2 | 4/2008 | Hasegawa et al. |
| 7,374,477 B2 | 5/2008 | Birang et al. |
| 7,500,901 B2 | 3/2009 | Swedek et al. |
| 7,508,201 B2 | 3/2009 | Tada et al. |
| 7,514,938 B2 | 4/2009 | Publicover et al. |
| 7,591,708 B2 | 9/2009 | Birang et al. |
| 7,619,414 B2 | 11/2009 | Yamamoto et al. |
| 7,635,331 B2 | 12/2009 | Kim et al. |
| 7,659,731 B2 | 2/2010 | Lin et al. |
| 7,682,221 B2 | 3/2010 | Swedek et al. |
| 7,714,572 B2 | 5/2010 | Tada et al. |
| 7,737,038 B2 | 6/2010 | Lee et al. |
| 7,795,866 B2 | 9/2010 | Fujita |
| 7,822,500 B2 | 10/2010 | Kobayashi et al. |
| 7,836,756 B2 | 11/2010 | Boudaoud et al. |
| 7,912,661 B2 | 3/2011 | Zeng et al. |
| 8,106,657 B2 | 1/2012 | Sakellariou et al. |
| 8,547,110 B2 | 10/2013 | Kesil et al. |
| 2003/0181827 A1 | 9/2003 | Hojeibane et al. |
| 2005/0156604 A1 | 7/2005 | Red'ko et al. |
| 2007/0103150 A1 | 5/2007 | Tada et al. |
| 2008/0143345 A1 | 6/2008 | Boudaoud et al. |
| 2008/0199359 A1 | 8/2008 | Davis et al. |
| 2009/0027070 A1 | 1/2009 | Gelling |
| 2009/0061733 A1 | 3/2009 | Fujita et al. |
| 2009/0079424 A1 | 3/2009 | Tralshawala et al. |
| 2009/0128272 A1 | 5/2009 | Hills |
| 2009/0132174 A1 | 5/2009 | Burke et al. |
| 2009/0256558 A1* | 10/2009 | Fujita .................... G01B 7/105 324/230 |
| 2010/0253371 A1 | 10/2010 | Bierl et al. |
| 2010/0327884 A1 | 12/2010 | McCall et al. |
| 2011/0068807 A1 | 3/2011 | Kesil et al. |

FOREIGN PATENT DOCUMENTS

| | | |
|---|---|---|
| WO | 2008076453 A1 | 6/2008 |
| WO | 2008145188 A1 | 12/2008 |
| WO | 2011038003 A1 | 3/2011 |

OTHER PUBLICATIONS

B. Jeanneret, J, L. Gavilano, G, A. Racine, Ch. Leemann and P. Martinoli: "Inductive conductance measurements in two-dimensional superconducting systems", Applied Physics Letters, vol. 55, No. 22, pp. 2336-2338, dated Nov. 27, 1989.
Notification Concerning Transmittal of International Preliminary Report on Patentability—Chapter I of the Patent Cooperation Treaty, dated Apr. 5, 2012, for International Pat. App. No. PCT/US2010/049824.
International Preliminary Report on Patentability, dated Mar. 27, 2012.
Written Opinion of the International Searching Authority for International Pat. App. No. PCT/2010/049824.
Restriction Requirement for U.S. Appl. No. 12/887,887, dated Jan. 8, 2013.
Notice of Allowance and Fee(s) Due for U.S. Appl. No. 12/887,887, dated May 28, 2013.
Supplemental Notice of Allowability for U.S. Appl. No. 12/887,887, dated Jun. 20, 2013.
Supplemental Notice of Allowability for U.S. Appl. No. 12/887,887, dated Jun. 25, 2013.
Response to After Allowance Amendment for U.S. Appl. No. 12/887,887, dated Jul. 26, 2013.
Notification of Transmittal of the International Preliminary Report on Patentability, dated Nov. 19, 2013, for International Pat. App. No. PCT/US2012/038369, notification mailed on Nov. 28, 2013.
International Preliminary Report on Patentability for International Pat. App. No. PCT/US2012/038369 and attached Written Opinion of the International Searching Authority for International Pat. App. No. PCT/US2012/038369, report dated Nov. 19, 2013.

* cited by examiner

APPARATUS AND METHOD OF USING IMPEDANCE RESONANCE SENSOR FOR THICKNESS MEASUREMENT

CROSS REFERENCE TO RELATED APPLICATIONS

This patent application claims priority to U.S. Provisional Application No. 61/487,932 entitled "Apparatus And Method of Using Impedance Resonance Sensor for Thickness Measurement", filed May 19, 2011, the entirety of which is incorporated herein by reference.

FIELD OF THE INVENTION

The present invention relates generally to a measurement apparatus and method for real time (in situ) monitoring thickness of a film during chemical mechanical polishing/planarization (CMP), deposition, etching and stand alone measurement processes.

DESCRIPTION OF THE PRIOR ART

An integrated circuit is typically formed on a silicon wafer or any other substrate by the sequential deposition of conductive, semiconductive or non-conductive films. While it is desirable to monitor each deposited layer for its thickness and planarity it is rarely done for lack of available process monitoring technologies or because of the high cost. As a series of layers are sequentially deposited and etched, the outer or uppermost surface of the substrate, i.e., the exposed surface of the substrate, becomes increasingly nonplanar. This nonplanar surface presents problems in the photolithographic steps of the integrated circuit fabrication process. Therefore, there is a need not only to control the thickness of deposited layers but also to periodically planarize the substrate surface. In addition, planarization is often needed to remove a filler layer until an underlying stop layer is exposed, or to create a layer with a defined thickness.

CMP is an accepted method of planarization. This planarization method typically requires that the substrate be mounted on a carrier or polishing head. Conventionally, the exposed surface of the substrate is placed against a rotating polishing pad, although a linear belt or other polishing surface can be used. The polishing pad may be either a "standard" pad or a fixed-abrasive pad. A standard pad has a durable roughened surface, whereas a fixed-abrasive pad has abrasive particles held in a containment media. The carrier head provides a controllable load on the substrate to push it against the polishing pad. A polishing slurry, including at least one chemically-reactive agent, and abrasive particles if a standard pad is used, is supplied to the surface of the polishing pad (also, some polishing processes use a "nonabrasive" process).

Currently numerous methods are used to monitor and control layer thickness and planarity during deposition and polishing processes. For example, the transparent substrate thickness can be monitored by an optical sensor, such as an interferometer or spectrometer. Alternatively, exposure of an underlying layer and the associated change in reflectivity of the substrate can be detected by reflectometer.

In addition, various methods are used to measure the layer thickness and planarity to determine endpoint by using indirect methods such as monitoring composition of slurry during CMP or gas flow and its composition during etching processes, development of complicated algorithms to monitor layer thickness and end-point detection, process time monitoring, etc.

U.S. Pat. Nos. 5,516,399, 5,559,428, 5,660,672, 5,731,697 and 6,072,313 describe a method of in-situ monitoring of the change in thickness of a conductive film on an underlying body by means of an eddy current sensor or set of eddy current sensors.

U.S. Pat. No. 7,682,221 describes a method of measuring conductive layer thickness during CMP where in thickness of conductive layer is calculated by measuring strength of magnetic field and phase difference between the magnetic field and drive signal by means of correlation factor.

U.S. Pat. No. 6,563,308 describes two kinds of eddy current sensors that could be used to detect endpoint and monitor conductive film thickness during CMP, deposition, etching and stand alone film thickness measurement processes.

U.S. Pat. No. 7,714,572 describes a method of using eddy current sensor for detecting continuous change in thickness of a first film and then, change in thickness of a second film, when the first film being formed on a substrate and the second film being formed on the first film. The method uses two different frequencies of alternating current; each film is measured at its specific frequency.

U.S. Pat. No. 7,070,476 describes a chemical mechanical polishing (CMP) system with an eddy current probe to measure in real-time film thickness.

SUMMARY

One of the main problems during deposition and CMP processes is determining whether the process is complete, e.g., whether a substrate layer has been planarized to a desired flatness, or to achieve the desired film thickness. If that is not accomplished correctly, the substrate should be returned for reprocessing or scrapped. The other serious problem is whether during CMP polishing an underlying layer has been exposed. If an excessive amount of material is removed (overpolishing), the substrate becomes unusable. On the other hand, if an insufficient amount of material is removed (underpolishing), the substrate must be returned into the CMP machine for further processing. Both problems require a time-consuming procedure that reduces the throughput of the deposition or CMP machine.

The polishing rate during CMP process is believed to be sensitive to numerous factors such as:
  a. condition and thickness of the polishing pad;
  b. the speed between the polishing pad and the substrate;
  c. the pressure applied to the substrate;
  d. the initial substrate topography;
  e. the slurry composition;
  f. there can be variations in the layers materials, thickness, transparency as well as variations of the layers in the substrate layers.

These numerous factors may cause variations in the time needed to reach the polishing endpoint. The polishing endpoint cannot be determined merely as a function of polishing time. At the present time, no single known metrology method could be used from start to the finish of the CMP process.

In one aspect, the present invention is directed to a novel apparatus for controlling CMP process which provides significantly improved accuracy.

In another aspect, the present invention is directed to a method for controlling CMP process which provides significantly improved accuracy. This method of controlling may pursue several objectives none of which are considered binding, such as for example:
    endpoint detection,
    changing of wafer carrier pressure on different wafer's zone to level film thickness during wafer polishing,
    measuring of film thickness in real time
    measuring remaining substrate thickness directly or indirectly to determine endpoint during grinding process (e.g., to determine distance to through silicon-vias (TSV))
    measuring of film removal rate In another aspect, the present invention may be used for controlling increasing film thickness during deposition processes (e.g. films deposited by evaporation, sputtering, physical vapor deposition (PVD), chemical vapor deposition (CVD), electro-chemical deposition (ECD) and plasma enhanced chemical vapor deposition (PECVD), atomic layer deposition (ALD), as well as other deposition methods). The availability of many parameters that control deposition process makes it complex. Manufacturer wishes to have a large degree of control over the growth and microstructure of the film. Real time feed-back about deposited film thickness and rate of deposition provided by the IR sensor will make the task of controlling the process and end point detecting simpler and more reliable. Also, the present invention may be used for controlling decreasing thickness and endpoint during removal of various films by etching (e.g. wet etching, ion etching, reactive ion etching (RIE), electrochemical etching, vapor etching, etc.) as well as stand-alone measurement processes when the film thickness does not change. Depending on conductivity of nontransparent and opaque layers, Eddy Current and Capacitance methods may be used to monitor and control layer thickness and/or planarity during deposition and polishing processes. Also, layer thickness monitoring and end-point detection may be achieved by process time monitoring and/or other indirect methods.

In yet another aspect, the apparatus and method of the present invention employ impedance resonance techniques for real time (in-situ) monitoring of the wafer's top layer thickness during a CMP, deposition and etching. The stand-alone measurements are done in-line before or after numerous IC chips, flat penal displays, photovoltaic and MEMS fabrication processes. While the present invention may be used in conjunction with any suitable sensor, sensor system and method(s) of use thereof, at least one particular sensor, sensor system and method(s) of use thereof, suitable for use in or with the one or more embodiments of the tools, apparatuses and methods of the present invention is described and claimed in U.S. patent application Ser. No. 12/887,887, filed Sep. 22, 2010, which is incorporated herein by reference in its entirety and for the purpose of disclosing at least one sensor, sensor system and method(s) of use thereof, suitable for use in or with the one or more embodiments of the tools, apparatuses and methods of the invention.

While the invention is not limited by any specific objective, the foregoing objective may be attained by using IR sensor embedded in a platen, e.g., as shown in FIG. 4 in case of CMP process, or embedded in an electrostatic chuck (or any other wafer holder), in case of deposition and etching (as shown in FIGS. 8 and 9, respectively). The IR sensor may be placed over x-y or x-theta stage holding wafer or substrate during stand alone measurement process as shown in FIG. 11.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. To assist those of ordinary skill in the relevant art in making and using the subject matter hereof, reference is made to the appended drawings and figures, wherein:

DETAILED DESCRIPTION OF THE PREFERRED EMBODIMENTS

The general concept of the preferred embodiment is to: (i) position a sensor which is an open core or air core double-coil inductor in close proximity to the measured object, so that the object would be electromagnetically coupled with one of the sensor's coils, named "sensing coil"; (ii) bring this sensing coil into a resonance condition by means of pumping an electromagnetic field of the other coil, named "excitation coil"; and (iii) measure the impact of the object on the self-resonant characteristics of the sensing coil.

Figure 1:
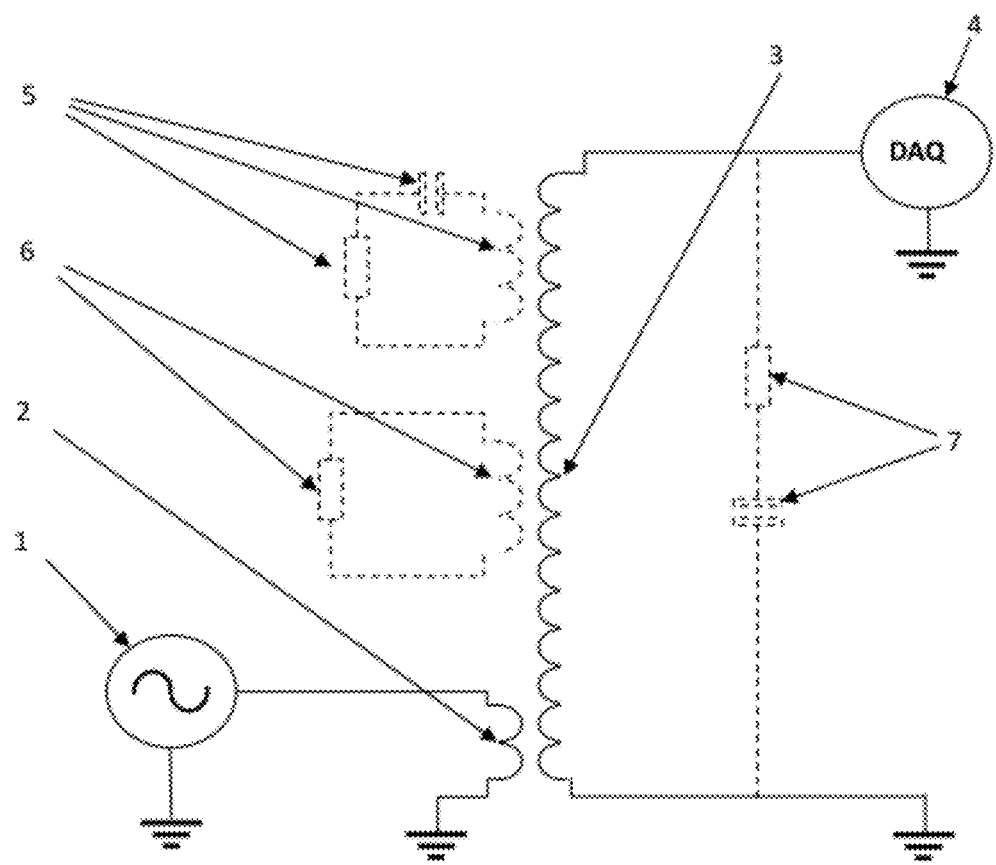
FIG. 1 depicts a simplified equivalent circuit of an IR sensor and object under test response.

FIG. 1 depicts at least one embodiment of a simplified equivalent circuit of an IR sensor of this invention and an object under test response. The IR sensor is depicted with solid lines, and is comprised of an alternating current source with frequency sweep 1, an excitation coil 2, a sensing coil 3, and a data processing system 4.

The function of the excitation coil 2 is to pump the sensing coil 3 with an electromagnetic energy and to separate a sensing resonance circuit from an impedance of an alternating current source, such as the alternating current source with frequency sweep 1.

A sensitive resonance circuit of this invention includes a sensing coil only, such as sensing coil 3, and may be described by one or more parameters of this sensing coil: inductance, inter-turn capacitance, and active resistance.

An IR sensor designed according to aspects of the present invention may provide a low capacitance value. It is preferably desirable to reduce capacitance to the lowest possible practical value such that the sensitivity of the IR sensor may be increased and/or maximized, thereby permitting the IR sensor to operate with a very wide range of useful signals.

A sensing coil, such as coil 3, may be coupled with high impedance (preferably in the range of about $10^7$ to about $10^{15}\Omega$) input of data acquisition unit (DAQ) 4 being part of a data processing system (also referred to as "DAQ 4").

Analysis of the equivalent circuit of IR sensor of present invention shows that output current from a sensing coil, such as coil 3, is usually very low (in the range of about $10^{-6}$ to about $10^{-14}$ A).

A response of an object under test is depicted with dashed lines in FIG. 1. Reactions of the object can be represented by three equivalent electrical circuits: 5, 6, and 7.

An alternating magnetic field of the sensing coil 3 operates to generate a vortex electric field E and this field E, in its turn, induces vortex currents of different type.

Figure 2:
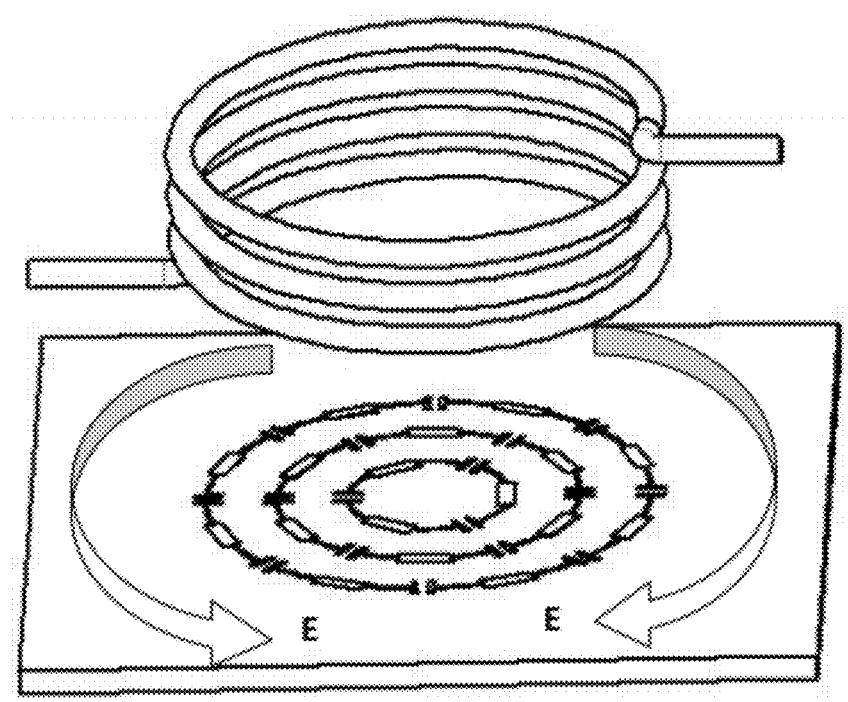
FIG. 2 illustrates response of dielectric object under test to vortex electric field.

If a sensing coil, such as coil 3, is positioned in close proximity to a dielectric solid object, the equivalent circuit 5 may comprise of resulting parameters inductance L, resistance R, and capacitance C. Impedance of circuit 5 reflects resistance to vortex displacement currents generated by vortex electric field E and energy dissipation occurs due to alternating dielectric polarization (FIG. 2).

Figure 3:
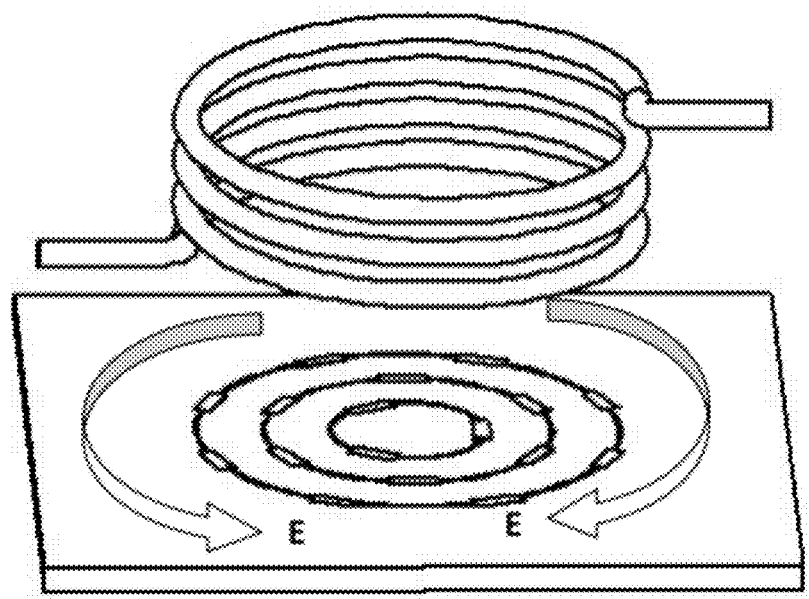
FIG. 3 illustrates response of conductive object under test to vortex electric field.

For conductive objects, such as, but not limited to, solid, liquid, etc., the equivalent electrical circuit 6 may have only two resulting parameters inductance L and resistance R. These parameters consider resistance to a vortex conductive current caused by the vortex electric field E, and energy dissipation occurs due to eddy currents (FIG. 3).

The alternating linear electric field E of the sensing coil 3 also induces linear currents of different type. Conductive and dielectric objects create capacitive coupling of sensor and object, and this relationship is presented by equivalent electrical circuit 7. The impedance reflects an object's resistance to linear conductive currents, displacement currents, or ionic currents generated by a potential gradient in a sensing coil or generated by a potential difference between coil and object under test (not illustrated).

In one or more embodiments of the present invention, a traditional electrical circuit, composed of an inductor and a capacitor, is replaced by an inductor alone. As such, a sensing coil, such as the sensing coil 3, may not be connected to a capacitance means located externally to the sensing coil such that the sensing coil is capable of measuring, or operates to measure, one or more properties of an object under test. The one or more properties that the sensing coil may measure may include at least one of conductance and one or more dielectric properties of at least a part of the object under test falling within a sensing (or sensitive) area or range of the sensing coil. The said inductor (induction coil) is a coreless (air core) or an open core type to serve as a sensing element. The sensing coil, such as the sensing coil 3, is a main part of the inductor, and its parameters define an operating frequency of the invented sensor. The sensor's sensitivity may be further increased by using a monolayer coil with a substantial step between turns or using basket winding to decrease self capacitance of the sensing coil, such as coil 3. By reducing the capacitance of the sensor, e.g., by not having a capacitance means (such as a capacitor) connected or located externally to the sensing coil, the sensitivity of the sensor is increased and/or maximized. Such increased sensitivity of the sensor permits the sensor to be capable of measuring one or more properties, including, but not limited to, at least one of conductance and one or more dielectric properties, of the object under test. Also, as an advantage of the increased sensitivity, the object under test may be at least one of conductive, semi-conductive and non-conductive.

While the invention is not limited to any specific theory, another significant feature that is believed to have contributed to high sensitivity of the invented sensor is an electrical separation of an AC current source, such as the source 1, from the sensing coil, such as the coil 3; this is done to exclude influence of source impedance on the sensor's sensitivity. An excitation coil, such as the coil 2, is used for electromagnetically transferring energy from the source of AC current, such as the source 1, to the sensing coil, such as the coil 3.

Another important aspect of our sensor design is high input impedance of the data processing module. To achieve high sensor sensitivity the input impedance should be high, preferably in the range of about $10^7$ to about $10^{15}\Omega$. Correctness of such a requirement can be illustrated by the formula:

$$W=V^2/R$$

where,
W is an energy dissipated on input resistance of data acquisition,
V is a voltage of a useful signal (for our DAQ it is 0.5-11 V), and
R is an input resistance of instrumentation connected to a sensing coil, such as the sensing coil 3 (for example the DAQ 4).

From the above formula, it is obvious that energy dissipation is smaller when a higher input resistance is used. For example, when we are replacing a 10 G$\Omega$ data acquisition block ("DAQ") by standard oscilloscope (even with a 10 M$\Omega$ attenuator), a drastic sink in sensor sensitivity is observed.

For example, the IR sensor developed by the applicant on the basis of the present invention for monitoring and controlling a CMP process has input impedance of its controller as high as Input Resistance of about 500 G$\Omega$ and Input Capacitance of about 1.5 pF. Results of measurements with this IR sensor are represented in FIGS. 12-16.

Choice of operating frequency range depends on material to be measured. In case of highly conductive metallic films, such as, but not limited to, copper, aluminum and tungsten, the operating frequency preferably is not too high to exclude an influence of a substrate on one or more results of a measurement of one or more conductive films. However, in one or more alternative embodiments, the operating frequency may be set to exclude any one or more influences as desired. Substrates are usually made of different types of silicon, glass, etc. that mostly have one or more high dielectric properties. Contribution to the sensor reading made by the substrate increases with an increasing of operating frequency. For at least one embodiment of an IR sensor of the present invention for monitoring and controlling CMP process, operational frequencies preferably fall into a range of about 2 to about 6 MHz.

For applications requiring measurement of less conductive and non-conductive materials, when response from vortex conductive currents is getting weaker, to increase a contribution to the response due to one or more dielectric properties of those materials, much higher operating frequencies are used. In order to optimize operating frequency for each specific measured material, an RF Impedance/Material Analyzer is used.

Figure 4:
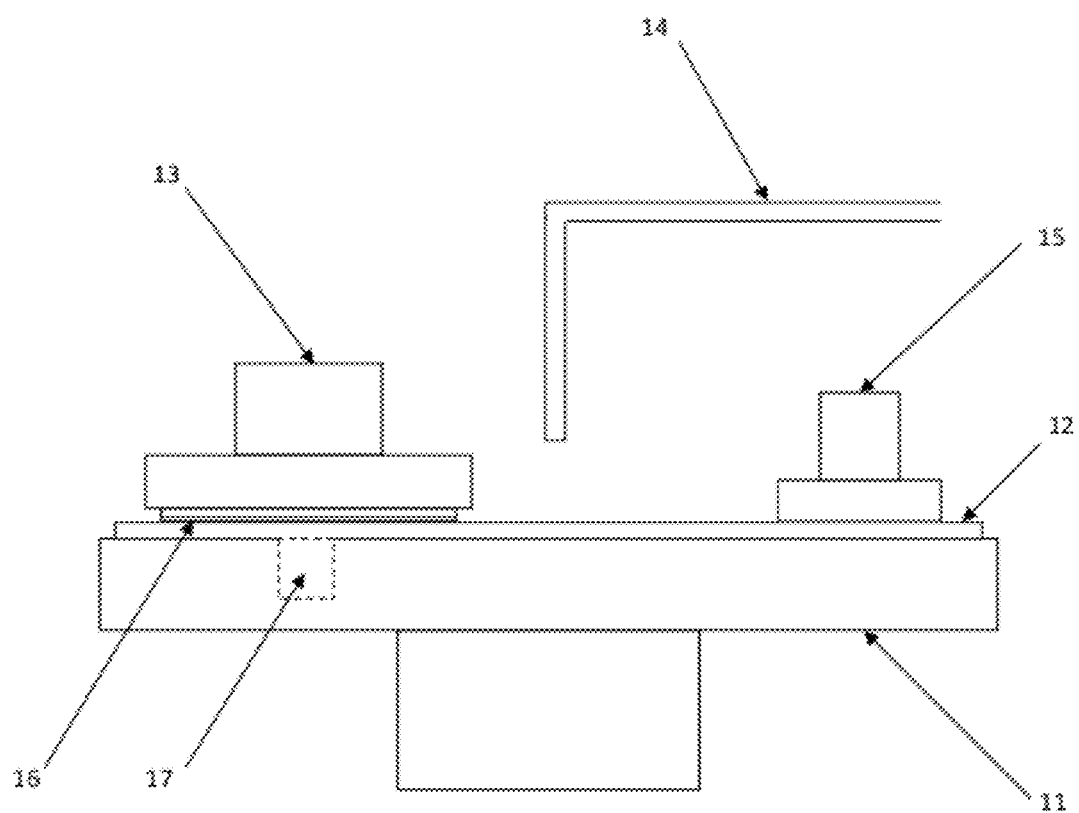
FIG. 4 depicts a Chemical Mechanical Polishing/Planarization (CMP) apparatus in accordance with one embodiment of the invention, including the IR sensor.

At least one embodiment of a Chemical Mechanical Polishing/Planarization (CMP) apparatus is depicted in FIG. 4, and includes a rotating polishing platen (polishing table) 11, a polishing pad 12, a rotating wafer handler 13, a source of slurry 14 and a rotating pad conditioner 15. The wafer handler 13 preferably holds a wafer 16 by vacuum and presses it to a polishing pad 12 surface soaked with polishing slurry comprising of an oxidizing agent and one or more types of abrasive particles. The polishing pad 12 may consist of a thin porous closed-cell polyurethane material. Because the surface of a new (unconditioned) polishing pad may be smooth, it may wet poorly and thus provide poor slurry transport to the pad/wafer interface. Pad conditioning is therefore useful to open up closed cells in the polyurethane pad. During polishing, a diamond abrasive pad conditioner 15 abrades the polishing pad 12, so its surface would be roughened, flattened, and refreshed. The CMP apparatus is supplied with an IR sensor 17, which may be embedded in the platen 11.

Figure 5:
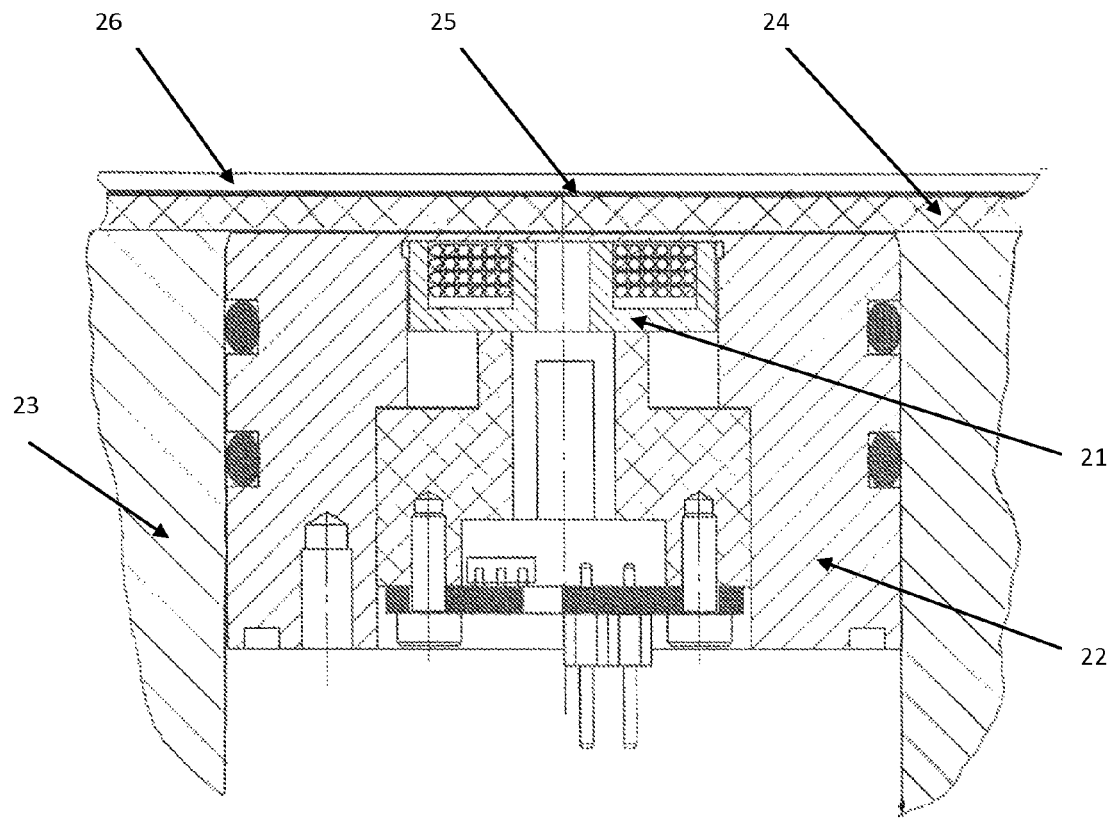
FIG. 5 depicts a sensing head of IR sensor embedded into platen of CMP apparatus.

FIG. 5 depicts a design of at least one embodiment of a system for controlling a CMP process. An open core inductor 21 is mounted into a housing 22. The housing in turn is embedded into a platen 23 of the CMP system. During the CMP process, the open core inductor 21 is emitting an alternating magnetic field that is penetrating through a polishing pad 24 and inducing currents in the film 25 to be removed from substrate 26.

Figure 6:
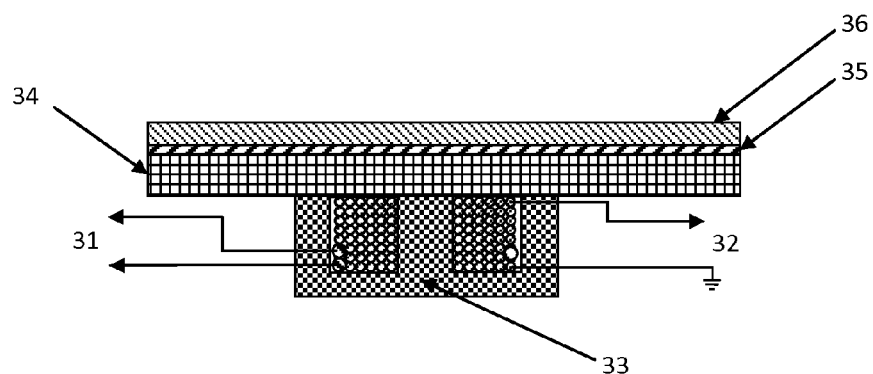
FIG. 6 depicts an open core inductor of the IR sensor.

FIG. 6 depicts at least one embodiment of a sensing element of an IR sensor, the open core inductor, comprising of a ferrite half pot core 33 and at least two coils: an excitation coil 31 and a sensing coil 32. The excitation coil 31 has one or a few turns and embraces the sensing coil 32. A purpose of the excitation coil 31 is to keep the sensing coil 32 in resonance condition during measuring local impedance of a wafer's part, such as when the wafer's part includes at least a portion of a substrate 35 and a film 36 that fall into a sensing area (also referred to herein as "a sensitive area") of the sensing coil 32 of the sensor, or a slurry's volume exposed to the sensor's sensing area through the polishing pad 34. The excitation coil 31 almost does not take part in the creation of a probing electromagnetic field. Specifically, its field only excites the sensing coil 32. First, the excitation coil 31 operates to excite one or more adjacent turns of the sensing coil 32. The one or more adjacent turns of the sensing coil 32 in turn excite the next one or more turns of the sensing coil 32 and so on, until such a "chain reaction" covers the entire sensing coil 32. After being excited, the sensing coil 32 keeps its resonant electromagnetic fluctuations by being fed with energy from the excitation coil 31 during the entire CMP process.

Figure 7:
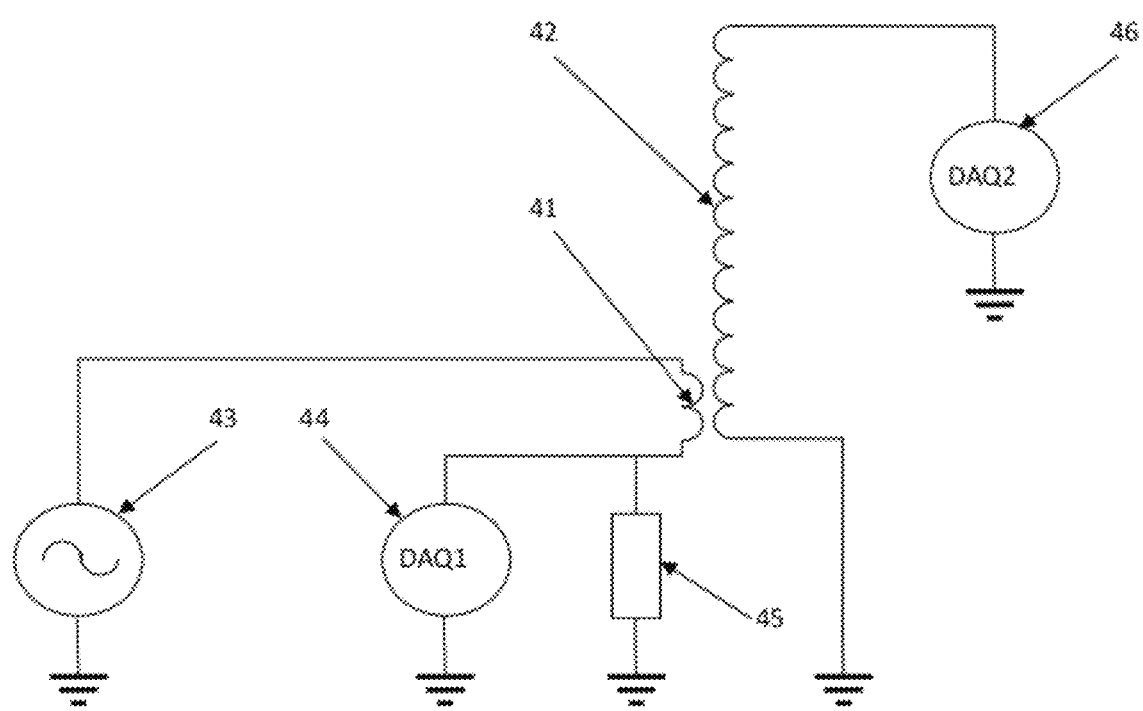
FIG. 7 is a schematic to illustrate a method of acquiring signal from the sensing head of IR sensor.

FIG. 7 illustrates a method of acquiring a signal from the sensing head of an IR sensor. To increase the sensitivity of the IR sensor, a data acquisition block collects information from both the sensing 42 and the excitation 41 coils.

Once a polished wafer falls within the IR sensor's sensing area, the polished wafer's impedance affects one or more electrical parameters not only in the sensing circuit comprising of the sensing coil 42 and a data acquisition unit (DAQ2) 46, but also it affects the excitation circuit comprising of generator 43 of the excitation coil 41, a bypass resistor 45 and a data acquisition unit (DAQ1) 44. The current that flows through the excitation winding grows proportionally with the amount of electromagnetic energy dissipated from the measured object. Such change in the current increases voltage amplitude on the bypass resistor 45, and the data acquisition unit 44 registers the voltage increase. Furthermore, electromagnetic interaction of the sensing coil 42 with the measured object changes resonance frequency and resonance amplitude, which are registered by the data acquisition unit 46.

A useful measurement signal may be formed by using various combinations of data obtained by the data acquisition units 44 and 46. For example, the following data can be used:

a) signal difference: "Vs−Vex" or "Vex−Vs" (where Vs is a voltage acquired by the data acquisition unit 46 and Vex is a voltage acquired by the data acquisition unit 44); and b) signal ratio: "Vs/Vex" or "Vex /Vs".

Examples presented in the following paragraphs are using an embodiment of the IR sensor developed by the applicant on the basis of one or more aspects of the present invention where a useful signal (data obtained from the sensor) is formed by using an RF/IF Gain and Phase Detector, which comprises a dual-channel demodulating logarithmic amplifier with a phase detector. Characteristics of this instrument are as follows: operating frequency range of 0 to 2.7 GHz; minimal output signal of 30 mV, which corresponds to −20×Log(Vex/Vm)=−30 dB; and maximal output signal of 1.8V, which corresponds to −20×Log(Vex/Vm)=+30 dB.

Figure 8:
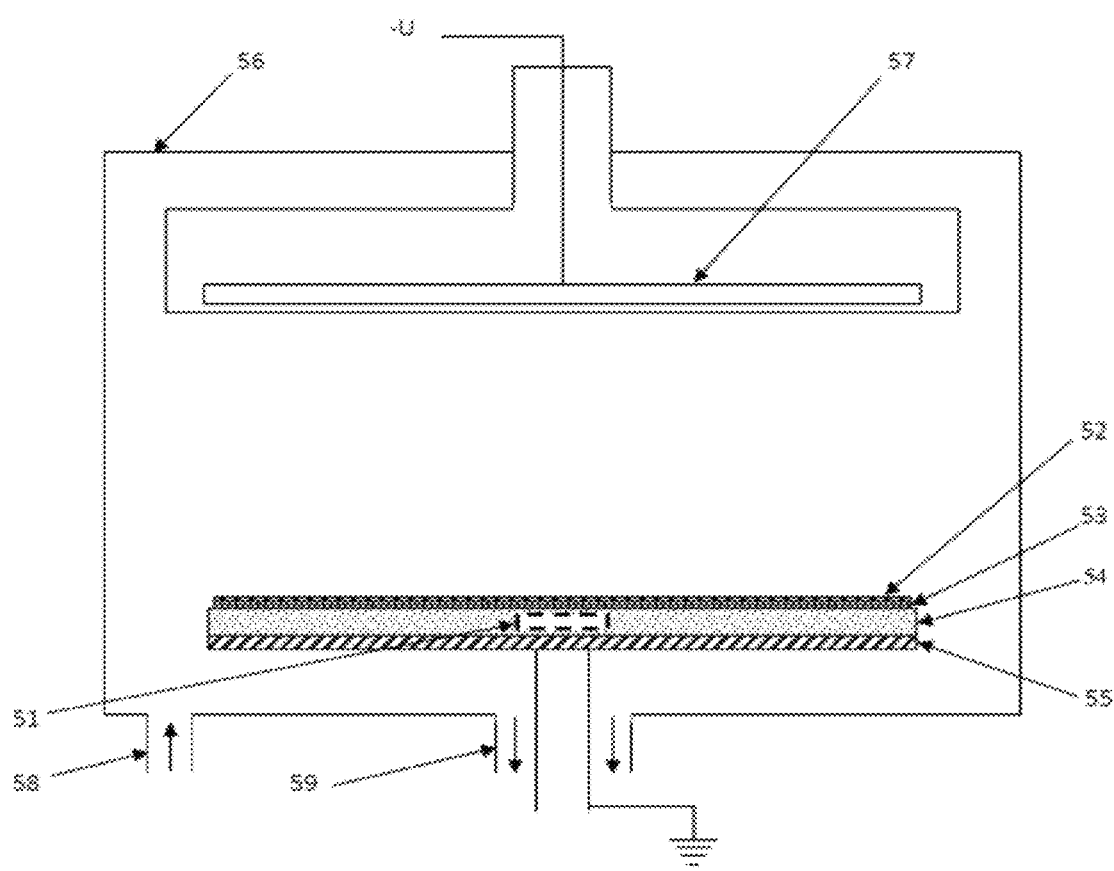
FIG. 8 depicts simplified version of deposition apparatus, which uses IR sensor for monitoring of the process.

FIG. 8 illustrates an embodiment, wherein the same type of sensor is used to monitor the formation of conductive, semiconductive and non-conductive films. Films can be deposited by evaporation, sputtering, PVD, CVD, ECD, PECVD and ALD as well as other methods. The figure depicts a much simplified version of a chemical vapor deposition reactor chamber for formation of a metal film, such as cooper or aluminum. Inside a vacuum chamber 56 with gas inlet 58 and gas outlet 59, an electrostatic chuck (holder) 54 placed on an anode 55 accepts a wafer or substrate 53. Material of a target (cathode) 57 in the chamber 56 reacts to form a metal film 52 on the wafer or substrate 53. The sensor 51 cannot be exposed to the atmosphere inside the chamber 56. Thus the sensor 51 is placed inside the holder 54 near the back of the wafer 53. When the film 52 comprises one or more conductive and/or semiconductive films 52, the eddy currents in the conductive and semiconductive films 52 may be monitored in-situ to determine the thickness of the film(s) 52 during deposition. When the film 52 comprises one or more non-conductive films 52, the vortex displacement currents in the non-conductive films 52 may be monitored in-situ to determine the thickness of the film(s) 52 during deposition. Here again, note that virtually any method of film formation can be monitored in situ in this manner, because of the unique positional deployment capability of the sensor 51 (e.g., within the holder 54). Even an RF plasma process can be monitored because the frequency of the sensor 51 can be chosen so that it will not interfere with the RF.

Figure 9:
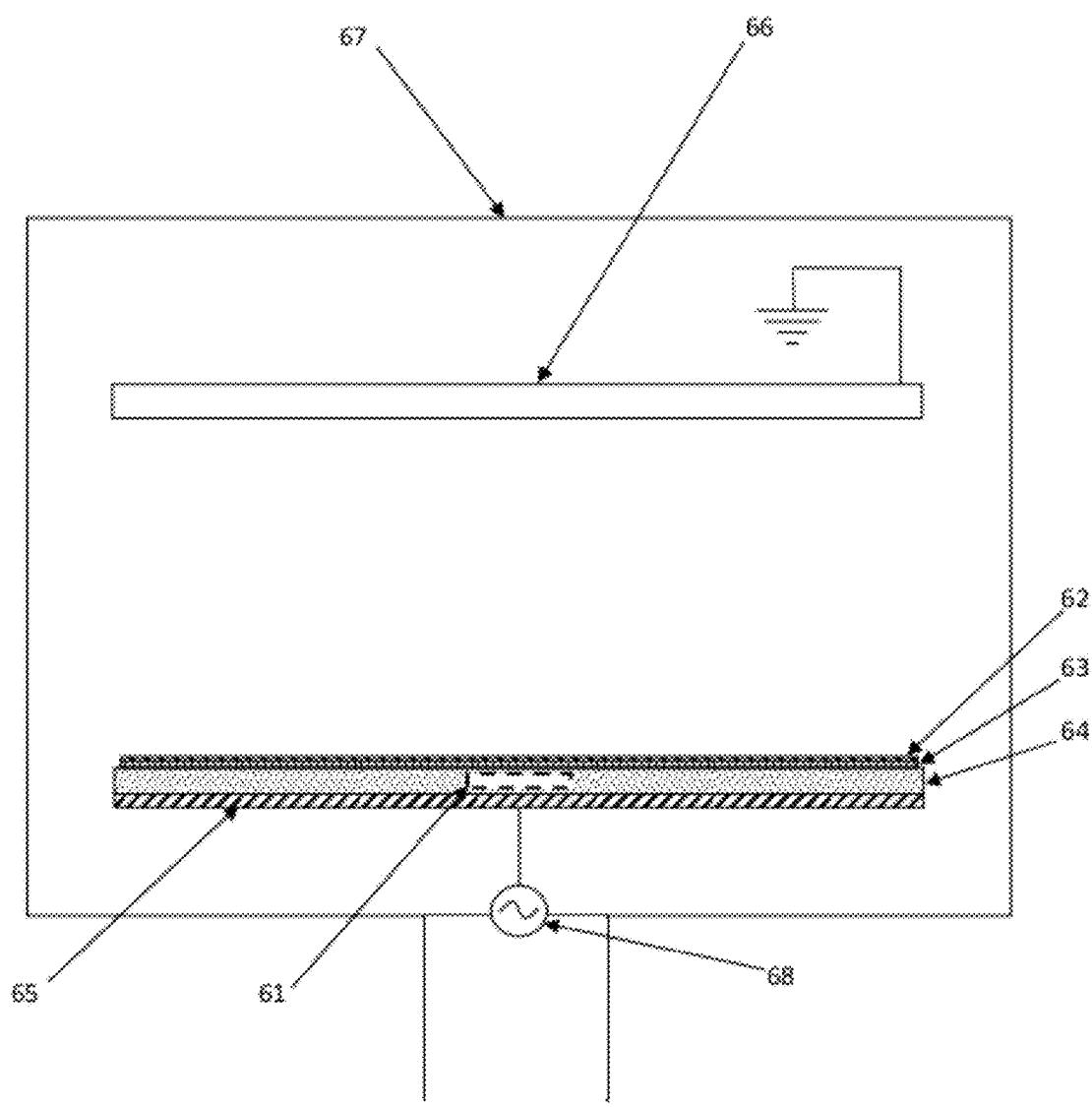
FIG. 9 depicts simplified version of etching apparatus, which uses IR sensor for monitoring of the process.

FIG. 9 illustrates an embodiment, wherein the same type of sensor is used to monitor the removal of a conductive, semiconductive and non-conductive film by etching. There are many different types of etching, for example RIE, plasma etching, wet etching, electrochemical etching, vapor etching and spray etching. The figure depicts a much simplified diagram of a wafer in a RIE chamber 67. A conductive film 62 on a wafer 63 sits on a platter 64, which in turn is placed on an electrode (cathode) 65, and another electrode 66 is grounded and serves as an anode. An RF source 68 applies a strong RF (radio frequency) electromagnetic field to the wafer platter 64. Chemical etchants are introduced into the chamber 67 to etch the film 62. These etchants must be kept away from the sensor 61, just as the chemical slurry is kept away from the sensor with a CMP process. Because the method of present invention allows for positioning of the sensor near to, but not in contact with, the back of the wafer 63, the sensor 61 can be placed inside a cavity formed in the electrode 65 (e.g., similar to holder 54 as discussed above). Alternatively or additionally, the sensor 61 may be placed inside a cavity formed in the wafer platter 64.

Note also that proper shielding and temperature monitoring of the sensor may be required, depending on the actual operation of the apparatus during CMP, deposition and etching process. However, these modifications could be easily made by integrating a temperature sensor with the IR sensor or by controlling environment by other means (e.g., monitoring temperature of slurry or change of temperature inside vacuum chamber, etc.).

Virtually any method of film removal and deposition can be monitored in situ and in real time in this manner because of the unique IR sensor design and methodology that provide significantly higher sensitivity (at least by a factor of one) than any known electrical sensor.

Figure 10:
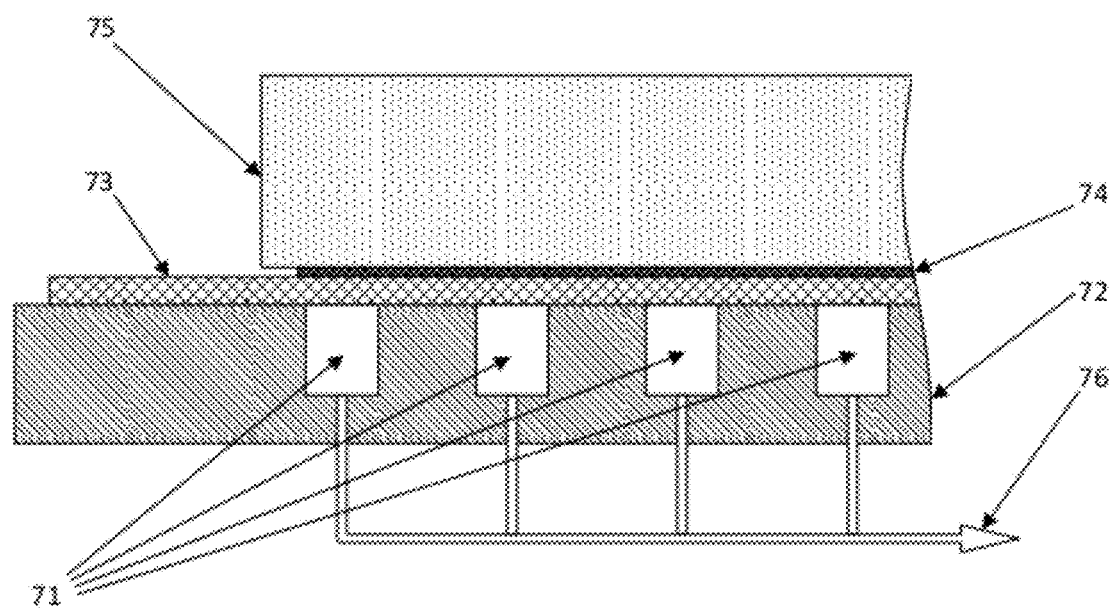
FIG. 10 illustrates using of multiple IR sensors in deposition and etching apparatuses.

FIG. 10 illustrates a multi-sensor embodiment in accordance with one or more aspects of the present invention. A set of IR sensors 71 is embedded in a platen 72. A wafer holder 75 presses a wafer 74 against a polishing pad 73, and information about the CMP process is collected by multiple sensors 71 and transferred to a control block through communication line 76. Such an embodiment can be used for deposition and etching processes as well.

Figure 11:
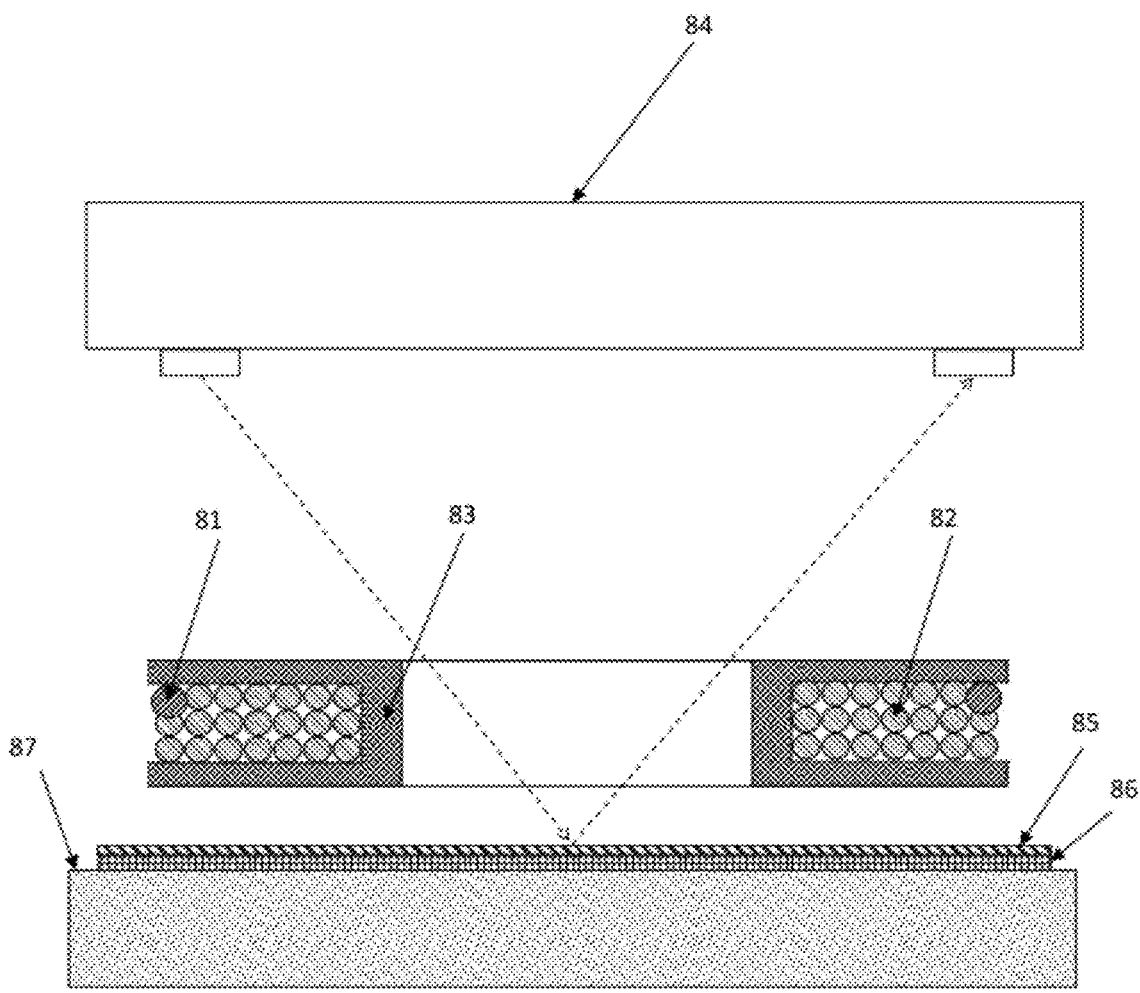
FIG. 11 illustrates using of IR sensor stand in a stand-alone measurement system.

FIG. 11 illustrates an embodiment in accordance with one or more aspects of the present invention, wherein the same type of IR sensor is used to monitor film thickness in a stand-alone application. The figure shows a much simplified diagram of a wafer 86 placed on a vacuum chuck of x-y or x-theta stage 87 with a film 85 disposed on a top of the wafer 86. The IR sensor comprising an excitation coil 81 and an sensing coil 82 wound on a bobbin 83 is placed over the wafer or substrate 86. Decreasing thickness of a polishing pad changes insignificantly to influence thickness measurement and end-point detection during CMP process. Because thickness of the wafer or substrate of one or more embodiments of the present invention does not change during deposition and etching process(es), the thickness has no influence on changing measured film thickness and endpoint detection. Only during stand-alone film thickness measurement, control of distance between the IR sensor and the measured film 85 is desirable if its fluctuations are significant. Measurement of distance between the IR sensor and the measured film 85 could be easily achieved by use of a laser (e.g., optical, capacitance, etc.) type displacement sensor. The hole in the center of the bobbin 83 is designed for using this IR sensor with an optical or laser displacement (proximity) sensor 84 to control distance from the coil to film 85 deposited on wafer or substrate 86. Proximity to the wafer or substrate 86 could be monitored by a capacitance type displacement (proximity) sensor by placing it in the hole or paling it around the bobbin 83. Distance (or gap) between an IR sensor and a targeted film (layer) in the object under test is a critical factor for stand-alone applications.

EXAMPLES

The following examples are intended to illustrate different applications of this invention, and are not intended to limit the scope of this invention. Persons of ordinary skill in the art can use the disclosures and teachings of this application to produce alternative embodiments without undue experimentation. Each of those embodiments is considered to be part of this invention.

Example 1

Typical Changing of Impedance Resonance Sensor's Signal During CMP Process

Figure 12:
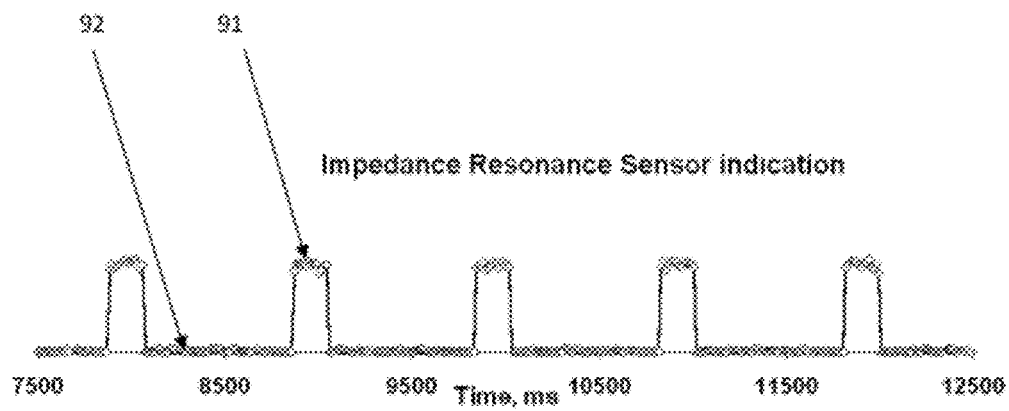
FIG. 12 depicts alternating IR sensor's reading which corresponds to wafer's presence and wafer's absence in sensing area of the sensor.

FIG. 12 depicts an alternating IR sensor's reading which corresponds to a wafer's presence 91 and a wafer's absence 92 in the sensing area of the sensor. As it can be seen from the graph the sensor periodically finds itself without the wafer in its sensing area. This circumstance can be successfully used in an algorithm to compensate "zero drift" caused by changing of temperature and/or other parameters.

Example 2

Figure 13:
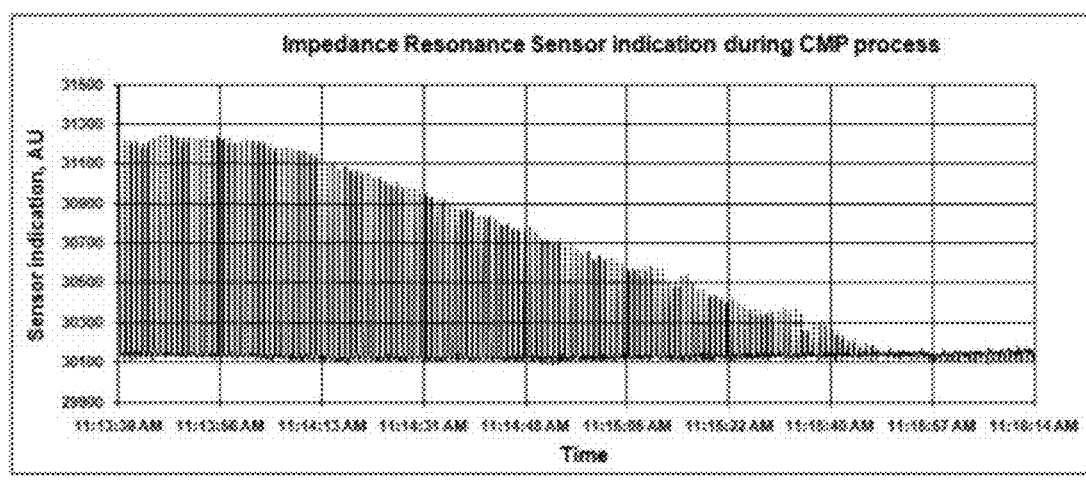
FIG. 13 depicts changing of IR sensor reading during CMP processing of copper film.

Typical changing of Impedance Resonance Sensor's Signal During CMP Processing of Copper Film FIG. 13 illustrates a changing of IR sensor reading during a copper film CMP process. At the start of the polishing process, electromagnetic coupling of the sensor with the conductive film is strong, significantly stronger than electromagnetic coupling with the substrate. When film thickness is getting thinner, electromagnetic coupling is dropping. The coupling ends when film is polished off, but the electromagnetic coupling with the substrate still remains and practically does not change. This situation, when the difference between a reading of the IR sensor in the presence of a polished wafer and a reading of the IR sensor when the wafer is absent is getting almost constant, indicates that the monitored film is already polished off. So due to very high sensitivity of IR sensor, "end point" of the polishing process can be determined with high accuracy without paying attention to possible "zero drift".

Example 3

Typical Changing of IR Sensor's Signal During CMP Processing of Tungsten Film

Figure 14:
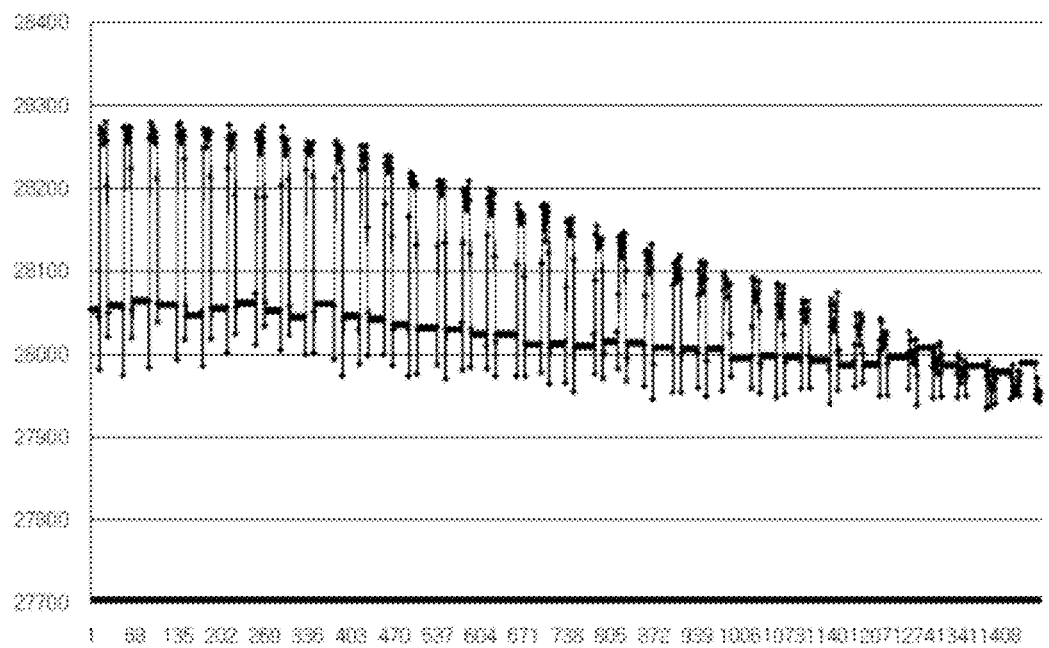
FIG. 14 depicts changing of IR sensor reading during CMP processing of tungsten film.
Figure 15:
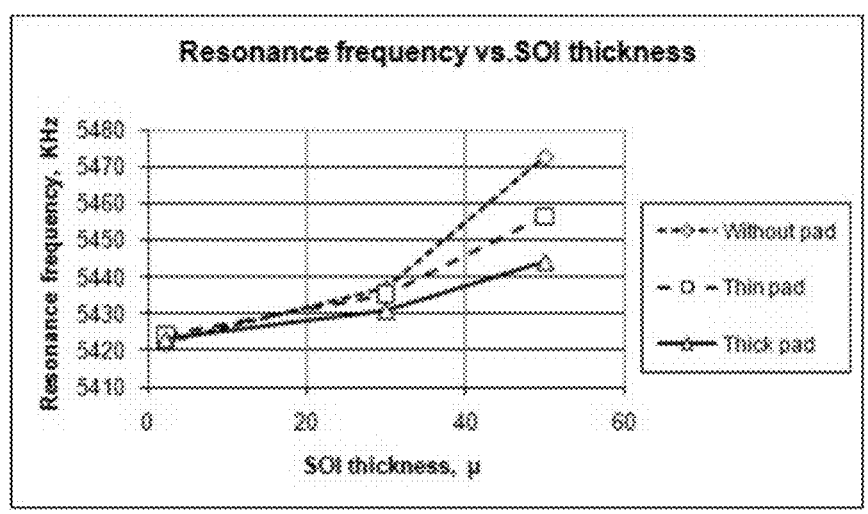
FIG. 15 depicts changing of IR sensor's resonance frequency relatively changing of Silicon on Insulator (SOI) film thickness.
Figure 16:
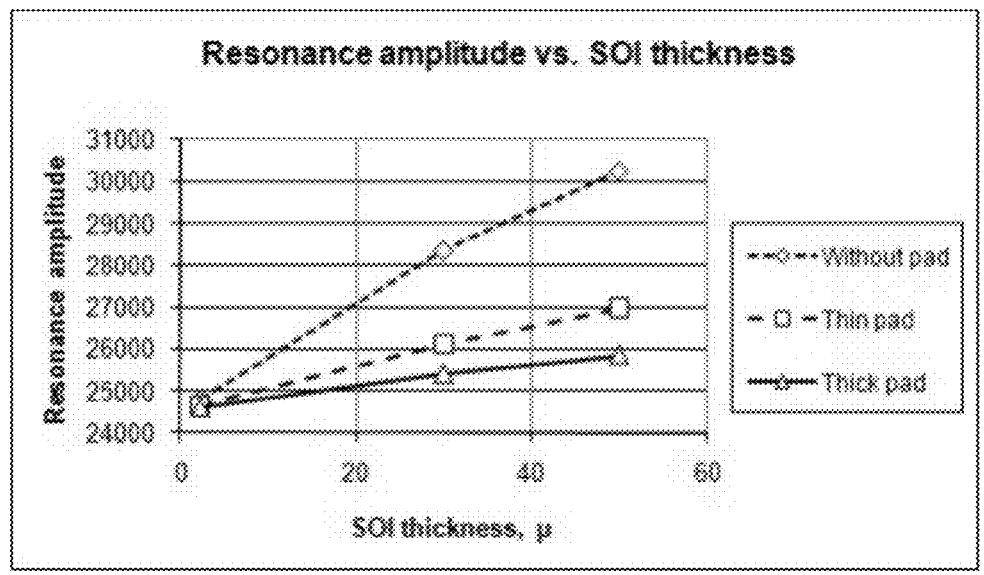
FIG. 16 depicts changing of IR sensor's resonance amplitude relatively changing of Silicon on Insulator (SOI) film thickness.

FIG. 14 illustrates a changing of IR sensor reading during CMP process used for Tungsten. As it can be seen from the drawing the profile of the IR sensor signal changing is the same as in, or substantially similar to, case of copper film. The difference is in signal level at the start of the CMP process: ~31200 Arbitrary Units (AU)—for copper film, and ~28300 AU—for tungsten film. Also in the case of tungsten planarization, the edge of the polished wafer is more noticeable; however, it does not impact on the end point detection.

Example 4

Exploration of Possibility to Use the Present Invention for CMP Process During Silicon on Insulator (SOI) Polishing In order to verify the possibility to use the present invention for measuring thickness of Silicon on Insulator (SOI) during CMP processes, the following wafers (see Table 1) have been measured by an IR sensor configured for semiconductors measurement.

TABLE 1

| # | SOI material | SOI Center thickness, (μm) | Buried oxide nominal thickness, (nm) | Handle wafer nominal thickness, (μm) |
|---|---|---|---|---|
| 1 | n<100>, <0.002 Ohmcm | 2.3 | 1000 | 400 |
| 2 | n<100>, <0.002 Ohmcm | 30 | 1000 | 400 |
| 3 | n<100>, <0.002 Ohmcm | 50 | 1000 | 400 |

The measurements were conducted without a pad and with two types of polishing pads: one type—1.3 mm thickness, and the other type—2.4 mm thickness. Results of these measurements are presented in FIG. 15 and FIG. 16. The conclusion that can be drawn from these charts is that one or more embodiments of the IR sensor of the present invention can be successfully used for CMP processes during Silicon on Insulator fabrication.

Example 5

Conductive and Non Conductive Specimens Testing

Figure 17:
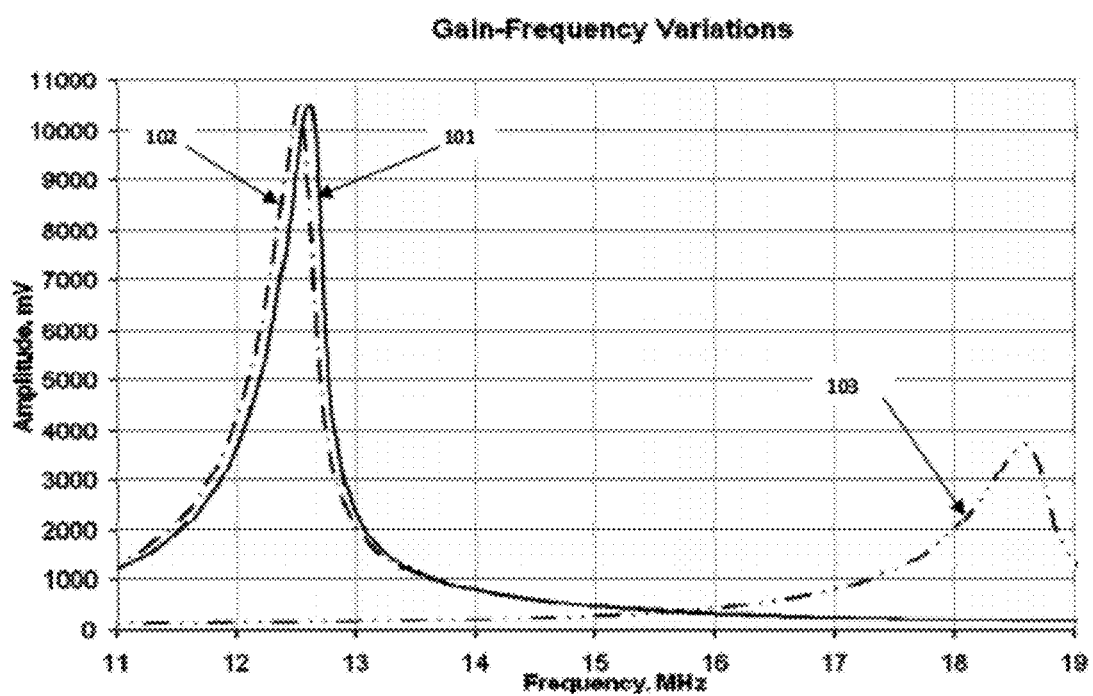
FIG. 17 depicts difference in influences on IR sensor's Gain-Frequency Variation of conductive and non-conductive specimens.

Two specimens of the same size and thickness (1 mm) were tested. One of the plates was made from aluminum and other from glass. The tests were conducted by an IR sensor with an air core inductor and a self resonant frequency of 12.6 MHz. FIG. 17 depicts the difference in influences on the IR sensor's Gain-Frequency Variation curves of these specimens. The curve 101 is corresponding to self resonance of the IR sensor without any specimens, and the curve 102 is corresponding to resonance of IR sensor in the presence of the glass specimen. The curve 103 is corresponding to resonance of IR sensor in presence of the aluminum specimen. The main difference is that a non-conductive specimen decreases resonant frequency and a conductive specimen increases resonant frequency. FIG. 2 and FIG. 3 can help to explain this phenomenon. An electromagnetic field emitted by an IR sensor cannot induce eddy currents in a non-conductive glass, but it can induce vortex displacement currents depicted on FIG. 2. Alternating dielectric polarization works like additional capacitance in resonance circuit, and this capacitance decreases the resonance frequency. In the case of the conductive aluminum specimen, an electromagnetic field emitted by an IR sensor induces traditional eddy currents depicted on FIG. 3. These currents in turn induce their own strong electromagnetic field in the opposite direction to the probing electromagnetic field. Such superposition of electromagnetic fields decreases total inductance of the resonance circuit, and the resonant frequency is getting higher. Mathematic simulation made for the simplified equivalent circuit of an IR sensor depicted on FIG. 1 proves the above-stated explanation.

Example 6

Figure 18:
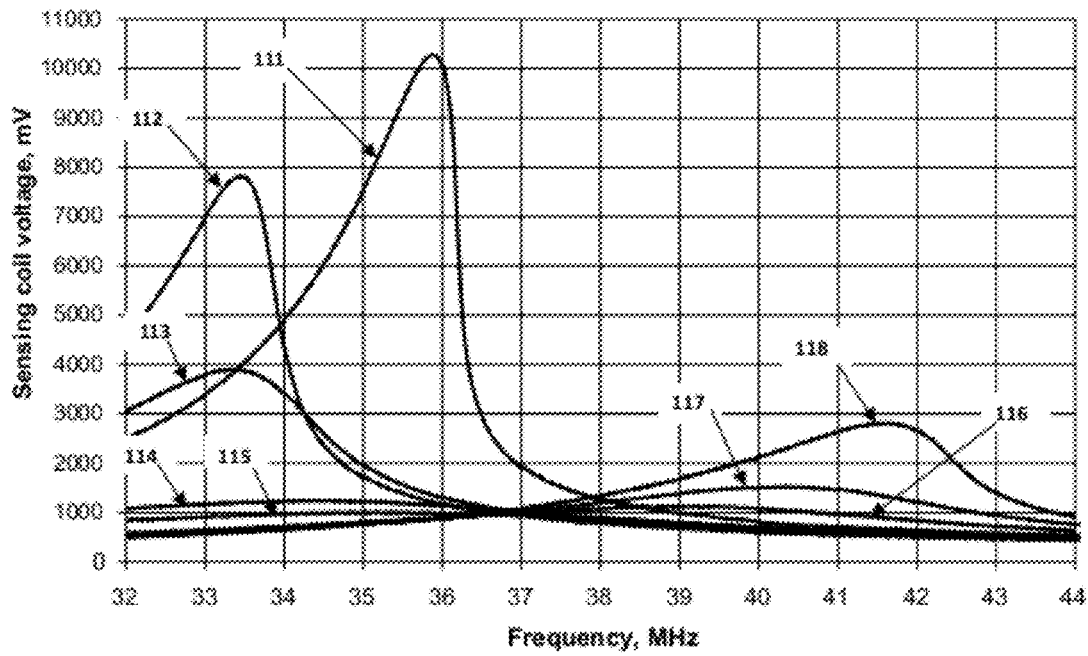
FIG. 18 depicts changing of IR sensor's Gain-Frequency Variation when measuring silicon wafers covered with aluminum film of different thickness.

Testing of Silicon Wafers Covered with Aluminum Film of Different Thickness Six 150 mm silicon wafers covered with aluminum film and one bare wafer were tested. The tests were conducted by an IR sensor with an air core inductor and a self resonant frequency of 35.9 MHz. FIG. 18 depicts the self resonant IR sensor's Gain-Frequency Variation curve 111 and the IR sensor's Gain-Frequency Variation curves for the seven tested wafers. The curve 112 is corresponding to the bare wafer. The curve 113 is corresponding to the wafer covered with aluminum film of 100 Å thickness. The curves 114 through 118 are corresponding to the wafers covered with aluminum film of 800 Å, 1000 Å, 2700 Å, 5000 Å and 12000 Å thickness, respectively. From comparing curves 111 and 112 (the bare wafer decreases the IR sensor resonant frequency) can be drawn a conclusion that in the case of the bare wafer dielectric alternating polarization currents (FIG. 2) prevail over semiconductive currents being carried either by the flow of electrons or by the flow of positively charged "holes" in the electron structure of the material. In the case of aluminum covered wafers, the resonant frequency increases in accordance with increasing of aluminum film thickness.

Example 7

Testing of Non Conductive Specimens with Different Dielectric Properties

Figure 19:
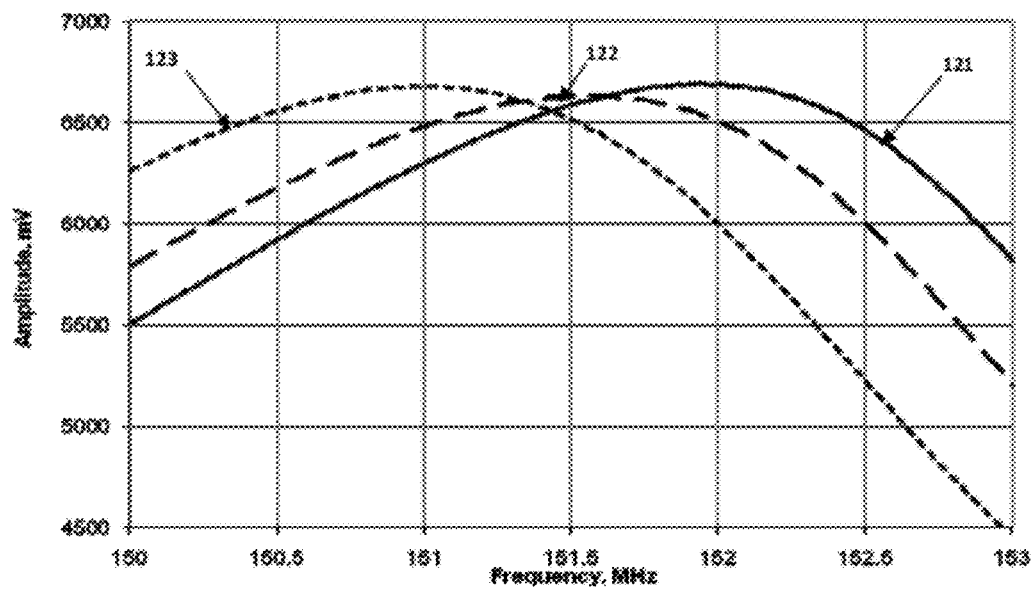
FIG. 19 depicts changing of IR sensor's Gain-Frequency Variation when measuring non-conductive specimens.

Two specimens of the same size and thickness (1 mm) were tested. One of the plates was made from PMMA (Plexiglas) and other from glass. The tests were conducted by an IR sensor with an air core inductor and a self resonant frequency of 152 MHz. FIG. 19 depicts the self resonant IR sensor's Gain-Frequency Variation curve 121 and the IR sensor's Gain-Frequency Variation curves for PMMA specimen 122 and glass specimen 123. These curves 121, 122, 123 show that the resonant frequency of the same size specimens changes in accordance with their dielectric properties. The dielectric constant of PMMA falls within the range of 2.6-3.5. The dielectric constant of glass falls within the range of 3.8-14.5. As it was mentioned above in non-conductive materials, the IR sensor doesn't induce eddy currents and induces vortex displacement currents only. Such alternating dielectric polarization works like additional capacitance in a resonance circuit. Capacitive conductance increases with increase of frequency. It explains why for this example the IR sensor with such a high operating frequency as 152 MHz was chosen.

While the present invention may be used in conjunction with any suitable sensor, at least one particular sensor suitable for use in or with the one or more embodiments of the tools, apparatuses and methods of the present invention is described and claimed in U.S. patent application Ser. No. 12/887,887, filed Sep. 22, 2010, which is incorporated herein by reference in its entirety and for the purpose of disclosing at least one sensor suitable for use in or with the one or more embodiments of the tools, apparatuses and methods of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. An apparatus for measuring film thickness on an underlying body comprising at least one Impedance Resonance (IR) sensor comprising the following:
   at least one sensing head which is an open core or coreless (air core) inductor comprising at least one excitation coil and at least one sensing coil, wherein: (i) said excitation coil is intended to propagate an energy to the sensing coil, which is intended to generate a probing electromagnetic field; (ii) said at least one sensing coil is designed in such a way that intrinsic inductance L, capacitance C, and resistance R parameters of said sensing coil are capable of providing resonance conditions within predetermined frequency range for measuring impedance of wafer (or substrate) part falling within the scope of the sensor's sensitive area; and (iii) said at least one sensing coil is not connected to any capacitance means located externally to said at least one sensing coil such that said at least one sensing coil is capable of measuring one or more properties of said wafer (or substrate) part;
   at least one power supply;
   at least one RF sweep generator electrically connected to said excitation coil;
   at least one data acquisition block with a high impedance input, greater than 10 MΩ electrically connected to both the excitation coil and the sensing coil of the sensor;
   at least one calculation block; and
   at least one communication block.

2. The apparatus of claim 1, wherein at least one of:
   (i) a core of the at least one said sensor's inductor is a ferrite pot half;
   (ii) the apparatus further comprises at least two sensors and the at least two sensors are configured to different predetermined resonant frequency ranges; and
   (iii) the at least one data acquisition block operates as a two-channel comparator and to increase the sensitivity of both of the IR sensor's excitation and sensing coils, the excitation and sensing coils being electrically connected to the two-channel comparator, wherein a first signal from the excitation coil is electrical current and a second signal from sensing coil is voltage, and the calculation block uses a ratio between the first and second signals, or a phase shift, or both the ratio between the first and second signals and the phase shift.

3. A Chemical Mechanical Polishing/Planarization (CMP) tool comprising at least one apparatus of claim 2 that operates to control a removal of film from an underlying body.

4. The CMP tool of claim 3, further comprising a polishing platen, wherein the at least one IR sensor is embedded in the polishing platen of the CMP tool.

5. The CMP tool of claim 3, further comprising a wafer handler, wherein the at least one IR sensor is embedded in the wafer handler of the CMP tool.

6. A method of monitoring conductive, semiconductive or non-conductive film thickness during chemical mechanical polishing/planarization using the apparatus of any of claims 3-5, the method comprising:
   positioning a wafer (or substrate) having a conductive, semiconductive or non-conductive film disposed thereon in contact with a polishing surface of a polishing pad;
   creating relative motion between the wafer (substrate) and the polishing pad to polish the wafer (substrate);
   providing the excitation coil of each said IR sensor with alternating current from the RF sweep generator, wherein a range of frequency sweeping includes a resonant frequency of the sensing coil electromagnetically coupled with a polished wafer (or substrate) part falling within the scope of the IR sensor's sensitive area, the excitation coil, being electromagnetically coupled with the sensing coil, propagates an energy to the sensing coil and the sensing coil in turn emits a probing electromagnetic field, which penetrates the polished wafer (or substrate) part falling within the scope of the IR sensor's sensitive area;
   perceiving an influence on the probing electromagnetic field induced by the measured film by means of both the excitation coil and the sensing coil of the sensor; and
   transferring information about the influence to the calculation block by means of the data acquisition block for data processing.

7. The method of claim 6, further comprising at least one of:
   (i) using data acquired in the wafer's (substrate's) presence for in real time (in-situ) controlling of film removing during a CMP process, wherein a rate of film removal is adjusted by changing the pressure of the wafer carrier against a different wafer's (or substrate's) zone to level film thickness;
   (ii) monitoring, in real time (in-situ), removal of a film during a CMP process to determine an "end point" of the CMP process, wherein said "end point" of the CMP process substantially corresponds or corresponds to a situation when a difference in the IR sensor's readings between two alternate states is getting constant, the first state occurring when the wafer (substrate) is present in the sensitive area of the sensor, and the second state occurring when there is no wafer (or substrate) within the sensitive area of the sensor;
   (iii) compensating a "zero drift" by using the sensor's reading while the sensor periodically finds itself without a wafer in its sensing area; and
   (iv) removing at least two films, wherein the at least one IR sensor is configured to control the removal of a first film of the at least two films and at least one other IR sensor is configured to control the removal of a second film of the at least two films.

8. The method of claim 7, wherein at least one of:
   (i) a reading, or the IR sensor's output used in data processing, of the at least one IR sensor is at least one of: the sensor's resonance frequency, the sensor's resonance amplitude, the sensor's phase shift measured at a fixed frequency chosen in a vicinity of the resonance frequency, and the sensor's amplitude measured at a fixed frequency chosen in a vicinity of the resonance frequency;
   (ii) the film thickness is being calculated during a wafer processing or one or more stand-alone measurements using previously prepared calibration data acquired by measuring one or more etalon wafers (or substrates) with known film thickness;
   (iii) the wafer processing stops when the film has reached a desired film thickness; and (iv) the results of the film thickness measurements of the conductive, semiconductive and non-conductive films deposited on the wafer or substrate operate to be used for one or more of the following:
determining the resistance and conductance of the film at a plurality of locations;
determining the sheet resistance at each of the plurality of locations;
determining the film thickness at the plurality of locations;
calculating average sheet resistance over the plurality of locations;
calculating average film thickness over the plurality of locations; and
calculating total film thickness deviation.

9. The method of claim 8, further comprising using two IR sensors of the at least one IR sensor, which are placed against opposite sides of the wafer, for excluding an influence of the underlying body's one or more electromagnetic properties on one or more results of the film thickness measurement(s).

10. The method of claim 6, wherein at least one of:
(i) a reading, or the IR sensor's output used in data processing, of the at least one IR sensor is at least one of: the sensor's resonance frequency, the sensor's resonance amplitude, the sensor's phase shift measured at a fixed frequency chosen in a vicinity of the resonance frequency, and the sensor's amplitude measured at a fixed frequency chosen in a vicinity of the resonance frequency;
(ii) the film thickness is being calculated during a wafer processing or one or more stand-alone measurements using previously prepared calibration data acquired by measuring one or more etalon wafers (or substrates) with known film thickness;
(iii) the wafer processing stops when the film has reached a desired film thickness; and
(iv) the results of the film thickness measurements of the conductive, semiconductive and non-conductive films deposited on the wafer or substrate operate to be used for one or more of the following:
determining the resistance and conductance of the film at a plurality of locations;
determining the sheet resistance at each of the plurality of locations;
determining the film thickness at the plurality of locations;
calculating average sheet resistance over the plurality of locations;
calculating average film thickness over the plurality of locations; and
calculating total film thickness deviation.

11. The method of claim 10, further comprising using two IR sensors of the at least one IR sensor, which are placed against opposite sides of the wafer, for excluding an influence of the underlying body's one or more electromagnetic properties on one or more results of the film thickness measurement(s).

12. An etching tool comprising at least one apparatus of claim 1 that operates to perform one or more etching processes to control a removal of film from an underlying body.

13. A deposition tool to perform one or more deposition processes to control a deposition of film onto an underlying body, the one or more deposition processes comprising at least one of: evaporation, sputtering, physical vapor deposition ("PVD"), chemical vapor deposition ("CVD"), electro-chemical deposition ("ECD"), plasma enhanced chemical vapor deposition ("PECVD") and atomic layer deposition ("ALD"), the deposition tool comprising at least one apparatus of claim 1.

14. A stand-alone metrology tool comprising at least one apparatus of claim 1.

15. The apparatus of any of claims 1-14, wherein at least one of:
(i) the at least one IR sensor is placed against a front side of a wafer;
(ii) the at least one IR sensor is placed against a back side of a wafer; and
(iii) the at least one IR sensor comprises at least two sensors and the at least two sensors are configured to different predetermined resonant frequency ranges.

16. A method for testing and inspecting one or more different properties of different materials using at least one Impedance Resonance (IR) sensor of claim 1, wherein the one or more different properties comprising at least one of: density, hardness, structure, and composition, the method comprising:
providing an excitation coil of at least one Impedance Resonance (IR) sensor with alternating current from an RF sweep generator, wherein a range of frequency sweeping includes a resonant frequency of a sensing coil electromagnetically coupled with a wafer (or a substrate) part falling within the scope of the IR sensor's sensitive area, the excitation coil, being electromagnetically coupled with the sensing coil, propagates an energy to the sensing coil and the sensing coil in turn emits a probing electromagnetic field, which penetrates the wafer (substrate) part falling within the scope of the IR sensor's sensitive area, the sensing coil is not connected to a capacitance means located externally to the sensing coil such that the sensing coil is capable of measuring one or more properties of the wafer (or substrate) part;
perceiving an influence on the probing electromagnetic field induced by the measured film by means of both the excitation coil and the sensing coil of the sensor; and
transferring information about the influence to a calculation block by means of a data acquisition block for data processing.

17. The method of claim 16, further comprising at least one of:
(i) measuring thickness and uniformity of different types of conductive, semiconductive and non-conductive coating, the coating comprising one or more of: paint, plating, insulator(s), and isolation such as cover for wires or other conductors, which are capable of preventing and/or reducing electrical shortcut;
(ii) detecting one or more of: corrosion, cracks, and metal fatigue of at least one of steering racks, gears, output shafts, aircraft's lending gear and fuselage skin panels; and
(iii) performing component unit defectoscopy of other vehicles, buildings and erections.

18. A method of measuring conductive, semiconductive or non-conductive film thickness, comprising:
providing an excitation coil of at least one Impedance Resonance (IR) sensor with alternating current from an RF sweep generator, wherein a range of frequency sweeping includes a resonant frequency of a sensing coil electromagnetically coupled with a wafer (or a substrate) part falling within the scope of the IR sensor's sensitive area, the excitation coil, being electromagnetically coupled with the sensing coil, propagates an energy to the sensing coil and the sensing coil in turn emits a probing electromagnetic field, which penetrates the wafer (substrate) part falling within the scope of the IR sensor's sensitive area, the sensing coil is not connected to any capacitance means located externally to the sensing coil such that the sensing coil is capable of measuring one or more properties of the wafer (or substrate) part;

perceiving an influence on the probing electromagnetic field induced by the measured film by means of both the excitation coil and the sensing coil of the sensor; and transferring information about the influence to a calculation block by means of a data acquisition block for data processing.

19. The method of claim 18, further comprising monitoring a conductive, semiconductive or non-conductive film thickness during a chemical mechanical polishing/planarization using an etching tool that operates to perform one or more etching processes to control a removal of film from an underlying body, the etching tool comprising at least one apparatus for measuring film thickness on an underlying body, the at least one apparatus comprising at least one Impedance Resonance (IR) sensor comprising the following:

at least one sensing head which is an open core or coreless (air core) inductor comprising at least one excitation coil and at least one sensing coil, wherein: (i) said excitation coil is intended to propagate an energy to the sensing coil, which is intended to generate a probing electromagnetic field; (ii) said at least one sensing coil is designed in such a way that intrinsic inductance L, capacitance C, and resistance R parameters of said sensing coil are capable of providing resonance conditions within predetermined frequency range for measuring impedance of wafer (or substrate) part falling within the scope of the sensor's sensitive area; and (iii) said at least one sensing coil is not connected to a capacitance means located externally to said at least one sensing coil such that said at least one sensing coil is capable of measuring one or more properties of said wafer (or substrate) part;

at least one power supply;

at least one RF sweep generator electrically connected to said excitation coil;

at least one data acquisition block with a high impedance input, greater than 10 MΩ electrically connected to both the excitation coil and the sensing coil of the sensor;

at least one calculation block; and at least one communication block.

20. The method of claim 18, further comprising monitoring a conductive, semiconductive or non-conductive film thickness during the one or more etching processes using an etching tool that operates to perform one or more etching processes to control a removal of film from an underlying body, the etching tool comprising at least one apparatus for measuring film thickness on an underlying body, the at least one apparatus comprising at least one Impedance Resonance (IR) sensor comprising the following:

at least one sensing head which is an open core or coreless (air core) inductor comprising at least one excitation coil and at least one sensing coil, wherein: (i) said excitation coil is intended to propagate an energy to the sensing coil, which is intended to generate a probing electromagnetic field; (ii) said at least one sensing coil is designed in such a way that intrinsic inductance L, capacitance C, and resistance R parameters of said sensing coil are capable of providing resonance conditions within predetermined frequency range for measuring impedance of wafer (or substrate) part falling within the scope of the sensor's sensitive area; and (iii) said at least one sensing coil is not connected to a capacitance means located externally to said at least one sensing coil such that said at least one sensing coil is capable of measuring one or more properties of said wafer (or substrate) part;

at least one power supply;

at least one RF sweep generator electrically connected to said excitation coil;

at least one data acquisition block with a high impedance input, greater than 10 MΩ electrically connected to both the excitation coil and the sensing coil of the sensor;

at least one calculation block; and at least one communication block.

21. The method of claim 18, further comprising monitoring a conductive, semiconductive or non-conductive film thickness during the one or more deposition processes using a deposition tool to perform one or more deposition processes to control a deposition of film onto an underlying body, the one or more deposition processes comprising at least one of: evaporation, sputtering, physical vapor deposition ("PVD"), chemical vapor deposition ("CVD"), electro-chemical deposition ("ECD"), plasma enhanced chemical vapor deposition ("PECVD") and atomic layer deposition ("ALD"), the deposition tool comprising at least one apparatus for measuring film thickness on an underlying body, the at least one apparatus comprising at least one Impedance Resonance (IR) sensor comprising the following:

at least one sensing head which is an open core or coreless (air core) inductor comprising at least one excitation coil and at least one sensing coil, wherein: (i) said excitation coil is intended to propagate an energy to the sensing coil, which is intended to generate a probing electromagnetic field; (ii) said at least one sensing coil is designed in such a way that intrinsic inductance L, capacitance C, and resistance R parameters of said sensing coil are capable of providing resonance conditions within predetermined frequency range for measuring impedance of wafer (or substrate) part falling within the scope of the sensor's sensitive area; and (iii) said at least one sensing coil is not connected to a capacitance means located externally to said at least one sensing coil such that said at least one sensing coil is capable of measuring one or more properties of said wafer (or substrate) part;

at least one power supply;

at least one RF sweep generator electrically connected to said excitation coil;

at least one data acquisition block with a high impedance input, greater than 10 MΩ electrically connected to both the excitation coil and the sensing coil of the sensor;

at least one calculation block; and at least one communication block.

22. The method of claim 18, further comprising measuring a conductive, semiconductive or non-conductive film thickness with a stand-alone metrology tool using a stand-alone metrology tool comprising at least one apparatus for measuring film thickness on an underlying body, the at least one apparatus comprising at least one Impedance Resonance (IR) sensor comprising the following:

at least one sensing head which is an open core or coreless (air core) inductor comprising at least one excitation coil and at least one sensing coil, wherein: (i) said excitation coil is intended to propagate an energy to the sensing coil, which is intended to generate a probing electromagnetic field; (ii) said at least one sensing coil is designed in such a way that intrinsic inductance L, capacitance C, and resistance R parameters of said sensing coil are capable of providing resonance conditions within predetermined frequency range for measuring impedance of wafer (or substrate) part falling within the scope of the sensor's sensitive area; and (iii) said at least one sensing coil is not connected to a capacitance means located externally to said at least one sensing coil such that said at least one sensing coil is capable of measuring one or more properties of said wafer (or substrate) part;

at least one power supply;

at least one RF sweep generator electrically connected to said excitation coil;

at least one data acquisition block with a high impedance input, greater than 10 MΩ electrically connected to both the excitation coil and the sensing coil of the sensor;

at least one calculation block; and at least one communication block.

23. The method of any of claims 18-22, wherein at least one of:
  (i) a reading, or the IR sensor's output used in data processing, of the at least one IR sensor is at least one of: the sensor's resonance frequency, the sensor's resonance amplitude, the sensor's phase shift measured at a fixed frequency chosen in a vicinity of the resonance frequency, and the sensor's amplitude measured at a fixed frequency chosen in a vicinity of the resonance frequency;
  (ii) the film thickness is being calculated during a wafer processing or one or more stand-alone measurements using previously prepared calibration data acquired by measuring one or more etalon wafers (or substrates) with known film thickness;
  (iii) the wafer processing stops when the film has reached a desired film thickness; and
  (iv) the results of the film thickness measurements of the conductive, semiconductive and non-conductive films deposited on the wafer or substrate operate to be used for one or more of the following:

determining the resistance and conductance of the film at a plurality of locations;

determining the sheet resistance at each of the plurality of locations;

determining the film thickness at the plurality of locations;

calculating average sheet resistance over the plurality of locations;

calculating average film thickness over the plurality of locations; and calculating total film thickness deviation.

24. The method of claim 23, further comprising at least one of:
  (i) using two IR sensors of the at least one IR sensor, which are placed against opposite sides of the wafer, for excluding an influence of the underlying body's one or more electromagnetic properties on one or more results of the film thickness measurement(s);
  (ii) measuring thickness and uniformity of different types of conductive, semiconductive and non-conductive coating, the coating comprising one or more of: paint, plating, insulator(s), and isolation such as cover for wires or other conductors, which are capable of preventing and/or reducing electrical shortcut;
  (iii) detecting one or more of: corrosion, cracks, and metal fatigue of at least one of steering racks, gears, output shafts, aircraft's lending gear and fuselage skin panels; and
  (iv) performing component unit defectoscopy of other vehicles, buildings and erections.

* * * * *